United States Patent
Wright (10) Patent No.: US 11,798,260 B2
(45) Date of Patent: Oct. 24, 2023

(54) APPARATUS, METHOD AND COMPUTER PROGRAM FOR AUTHENTICATING IMAGES

(71) Applicant: Nokia Technologies Oy, Espoo (FI)

(72) Inventor: Christopher Wright, London (GB)

(73) Assignee: Nokia Technologies Oy, Espoo (FI)

( * ) Notice: Subject to any disclaimer, the term of this patent is extended or adjusted under 35 U.S.C. 154(b) by 232 days.

(21) Appl. No.: 17/361,947

(22) Filed: Jun. 29, 2021

(65) Prior Publication Data

US 2022/0027660 A1 Jan. 27, 2022

(30) Foreign Application Priority Data

Jul. 22, 2020 (EP) .................................... 20187090

(51) Int. Cl.
| | | |
|---|---|---|
| *G06V 20/00* | (2022.01) | |
| *G06V 10/60* | (2022.01) | |
| *G06F 3/01* | (2006.01) | |
| *G06F 21/31* | (2013.01) | |

(52) U.S. Cl.
CPC .............. *G06V 10/60* (2022.01); *G06F 3/017* (2013.01); *G06F 21/31* (2013.01); *G06V 20/00* (2022.01)

(58) Field of Classification Search
CPC ........ G06V 10/60; G06V 20/00; G06V 20/95; G06F 3/017; G06F 21/31; G06F 21/36
See application file for complete search history.

(56) References Cited

U.S. PATENT DOCUMENTS

| | | |
|---|---|---|
| 9,465,484 B1 | 10/2016 | Kamarshi et al. |
| 10,409,385 B2 | 9/2019 | Poupyrev |
| 2013/0004016 A1 | 1/2013 | Karakotsios et al. |
| 2013/0015946 A1 | 1/2013 | Lau et al. |

(Continued)

FOREIGN PATENT DOCUMENTS

| | | | |
|---|---|---|---|
| EP | 0837418 A2 * | 4/1998 | |
| WO | 2019/118716 A1 | 6/2019 | |

(Continued)

OTHER PUBLICATIONS

"MIT CSAIL: Revealing hidden video from shadows", TechXplore, Retrieved on Jun. 29, 2021, Webpage available at : https://techxplore.com/news/2019-12-mit-csail-revealing-hidden-video.html.

(Continued)

*Primary Examiner* — Carol Wang
(74) *Attorney, Agent, or Firm* — Harrington & Smith (57) ABSTRACT

Examples of the disclosure provide an apparatus for authentication of images. The apparatus comprises means for: receiving one or more images captured by an imaging device; extracting one or more light patterns from the one or more images where the one or more light patterns correspond to light reflected from at least part of an object that was positioned out of field of view of the imaging device when the one or more images were captured so that the at least part the object does not appear in the one or more images but light reflected from the at least part of the object that was positioned out of field of view creates the one or more light patterns in the one or more images; and determining if the extracted one or more light patterns correspond to a predetermined object to enable authentication of the one or more images.

13 Claims, 4 Drawing Sheets

(56) References Cited

U.S. PATENT DOCUMENTS

| | | | |
|---|---|---|---|
| 2013/0100250 A1* | 4/2013 | Raskar | G01S 7/4808 |
| | | | 348/46 |
| 2013/0269013 A1* | 10/2013 | Parry | H04L 63/0861 |
| | | | 726/7 |
| 2014/0109208 A1 | 4/2014 | Song | |
| 2016/0253821 A1* | 9/2016 | Romano | G06V 10/141 |
| | | | 382/103 |
| 2019/0072655 A1* | 3/2019 | Tan | G06N 3/04 |
| 2020/0026360 A1 | 1/2020 | Baheti et al. | |
| 2020/0064996 A1 | 2/2020 | Giusti et al. | |

FOREIGN PATENT DOCUMENTS

| | | | | |
|---|---|---|---|---|
| WO | 2019/168547 A1 | 9/2019 | | |
| WO | WO-2020071008 A1 * | 4/2020 | | G06F 21/32 |

OTHER PUBLICATIONS

"Technology", iproov, Retrieved on Jun. 29, 2021, Webpage available at : https://www.iproov.com/iproov-system/technology.

Lien et al., "Soli: Ubiquitous Gesture Sensing with Millimeter Wave Radar", ACM Transactions on Graphics, vol. 35, No. 4, Jul. 2016, pp. 1-19.

"Online marketplaces set to exceed $7 trillion by 2024", UK Tech News, Retrieved on Jun. 29, 2021, Webpage available at : https://www.uktech.news/news/online-marketplaces-set-to-exceed-%247-trillion-in-sales-by-2024-20191023.

Extended European Search Report received for corresponding European Patent Application No. 20187090.4, dated Jan. 11, 2021, 11 pages.

Kee et al., "Exposing Photo Manipulation from Shading and Shadows", ACM Transactions on Graphics, vol. 33, No. 5, 2014, pp. 165:1-165:21.

* cited by examiner

APPARATUS, METHOD AND COMPUTER PROGRAM FOR AUTHENTICATING IMAGES

TECHNOLOGICAL FIELD

Examples of the disclosure relate to apparatus, methods and computer programs for authenticating images. Some relate to apparatus, methods and computer programs for authenticating images using one or more light patterns within the images.

BACKGROUND

In some circumstances it can be useful to enable images to be authenticated. This can enable verification of items in an image or enable verification of the sender of the image. For example, in an online market place sellers can upload images of items that they wish to sell. It is useful to enable these images to be authenticated to avoid fraudulent activity in such market places.

BRIEF SUMMARY

According to various, but not necessarily all, examples of the disclosure there is provided an apparatus comprising means for: receiving one or more images captured by an imaging device;
  extracting one or more light patterns from the one or more images where the one or more light patterns correspond to light reflected from at least part of an object that was positioned out of field of view of the imaging device when the one or more images were captured so that the at least part the object does not appear in the one or more images but light reflected from the at least part of the object that was positioned out of field of view creates the one or more light patterns in the one or more images; and determining if the extracted one or more light patterns correspond to a predetermined object to enable authentication of the one or more images.

The predetermined object may comprise an object that creates one or more detectable light patterns within one or more images when the object is positioned at least partially out of field of view of the imaging device while the one or more images are captured.

The predetermined object may comprise an object that is specific to a user of the imaging device.

The predetermined object may comprise a user's hand performing a predetermined gesture at least partially out of field of view of the imaging device.

The object may be positioned at least partially out of field of view of the imaging device so that at least part of the object does not appear in the one or more images but light reflected from the object is captured in the one or more images.

The predetermined object may be positioned at a predetermined location relative to the imaging device when the one or more images are captured.

The apparatus may be configured to access a database comprising information associating a user of the imaging device with the predetermined object.

The apparatus may be configured to use machine learning to extract one or more light patterns from the one or more images and determine if the extracted one or more light patterns correspond to the predetermined object.

The apparatus may be configured to determine an identifying coded lighting output and enable the identifying coded lighting output to be provided to the imaging device so that the identifying coded lighting output can be used by the imaging device to ensure that one or more identifiable light patterns are provided by reflection from the at least part of the object that was positioned out of field of view when the one or more images are captured.

The identifying coded lighting output may comprise one or more of; spatial variation in light, variation in colours of light, variations in intensity of the light.

According to various, but not necessarily all, examples of the disclosure there is provided an apparatus comprising at least one processor; and at least one memory including computer program code, the at least one memory and the computer program code configured to, with the at least one processor, cause the apparatus at least to perform: receiving one or more images captured by an imaging device; extracting one or more light patterns from the one or more images where the one or more light patterns correspond to light reflected from at least part of an object that was positioned out of field of view of the imaging device when the one or more images were captured so that the at least part the object does not appear in the one or more images but light reflected from the at least part of the object that was positioned out of field of view creates the one or more light patterns in the one or more images; and determining if the extracted one or more light patterns correspond to a predetermined object to enable authentication of the one or more images.

According to various, but not necessarily all, examples of the disclosure there is provided a method comprising: receiving one or more images captured by an imaging device; extracting one or more light patterns from the one or more images where the one or more light patterns correspond to light reflected from at least part of an object that was positioned out of field of view of the imaging device when the one or more images were captured so that the at least part the object does not appear in the one or more images but light reflected from the at least part of the object that was positioned out of field of view creates the one or more light patterns in the one or more images; and determining if the extracted one or more light patterns correspond to a predetermined object to enable authentication of the one or more images.

According to various, but not necessarily all, examples of the disclosure there is provided a computer program comprising computer program instructions that, when executed by processing circuitry, cause: receiving one or more images captured by an imaging device; extracting one or more light patterns from the one or more images where the one or more light patterns correspond to light reflected from at least part of an object that was positioned out of field of view of the imaging device when the one or more images were captured so that the at least part the object does not appear in the one or more images but light reflected from the at least part of the object that was positioned out of field of view creates the one or more light patterns in the one or more images; and determining if the extracted one or more light patterns correspond to a predetermined object to enable authentication of the one or more images.

According to various, but not necessarily all, examples of the disclosure there is provided an imaging device comprising means for: capturing an one or more images while at least part of an object is positioned out of field of view of the imaging device so that the at least part the object does not appear in the one or more images but light reflected from the at least part of the object that is positioned out of field of view creates a detectable one or more light patterns in the one or more images; and enabling the one or more images to be transmitted to a third party apparatus to enable the detectable one or more light patterns to be used to authenticate the one or more images.

The imaging device may be configured to provide instructions to a user when capturing one or more images to enable a user to position at least part of the object out of field of view of camera while the one or more images are being captured.

The instructions may specify one or more of; a gesture to be performed by the user of the imaging device, an orientation of the object, a location of the object.

The apparatus may be configured to provide confirmation to the user that the object has been correctly used.

The imaging device may be configured to use an identifying coded lighting output for capturing the one or more images.

According to various, but not necessarily all, examples of the disclosure there is provided an imaging device comprising at least one processor; and at least one memory including computer program code, the at least one memory and the computer program code configured to, with the at least one processor, cause the imaging device at least to perform: capturing one or more images while at least part of an object is positioned out of field of view of the imaging device so that the at least part the object does not appear in the one or more images but light reflected from the at least part of the object that is positioned out of field of view creates one or more detectable light patterns in the one or more images; and enabling the image to be transmitted to a third party apparatus to enable the one or more detectable light patterns to be used to authenticate the one or more images.

According to various, but not necessarily all, examples of the disclosure there is provided a method comprising: capturing one or more images while at least part of an object is positioned out of field of view of the imaging device so that the at least part the object does not appear in the one or more images but light reflected from the at least part of the object that is positioned out of field of view creates one or more detectable light patterns in the one or more images; and enabling the image to be transmitted to a third party apparatus to enable the one or more detectable light patterns to be used to authenticate the one or more images.

According to various, but not necessarily all, examples of the disclosure there is provided a computer program comprising computer program instructions that, when executed by processing circuitry, cause: capturing one or more images while at least part of an object is positioned out of field of view of the imaging device so that the at least part the object does not appear in the one or more images but light reflected from the at least part of the object that is positioned out of field of view creates one or more detectable light patterns in the one or more images; and enabling the image to be transmitted to a third party apparatus to enable the one or more detectable light patterns to be used to authenticate the one or more images.

BRIEF DESCRIPTION

Some examples will now be described with reference to the accompanying drawings in which.

DETAILED DESCRIPTION

Examples of the disclosure relate to apparatus 101, methods and computer programs 109 that can be used to enable images to be authenticated. The apparatus 110, methods and computer programs 109 can enable one or more light patterns to be detected in captured images where the one or more light patterns correspond to light reflected from an object 217 or part of an object 217 that was positioned out of a field of view 213 of an imaging device 201 when the image was captured. The one or more detected light patterns can then enable authentication of the image.

Figure 1:
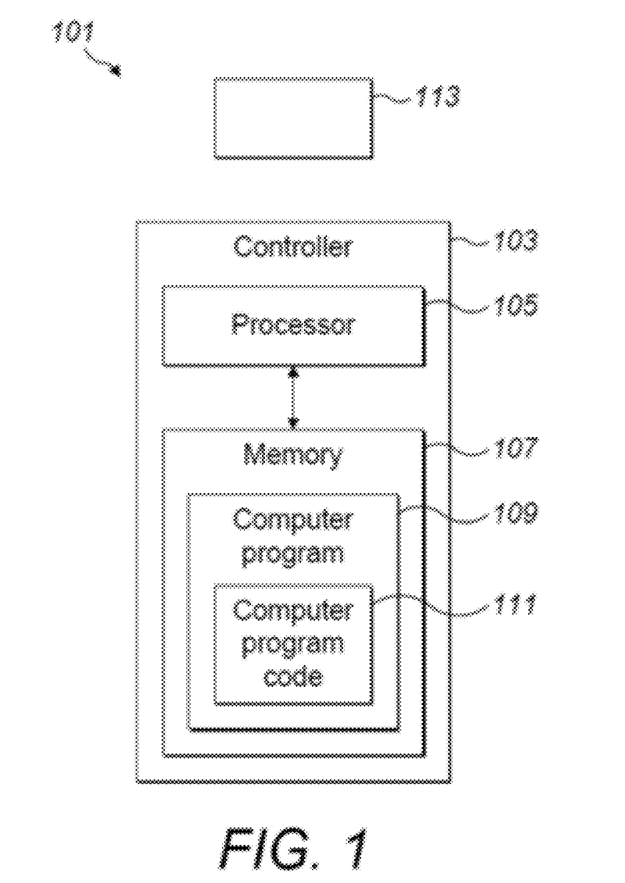
FIG. 1 shows an example apparatus.

FIG. 1 schematically illustrates an apparatus 101 according to examples of the disclosure. The apparatus 101 illustrated in FIG. 1 may be a chip or a chip-set. In some examples the apparatus 101 may be provided within server devices. The server devices could enable an online market place to be provided or could enable any other type of service that requires images to be authenticated. In some examples the apparatus 101 could be provided within an imaging device 201 such as a camera or mobile phone or other suitable device.

In the example of FIG. 1 the apparatus 101 comprises a controller 103. In the example of FIG. 1 the implementation of the controller 103 may be as controller circuitry. In some examples the controller 103 may be implemented in hardware alone, have certain aspects in software including firmware alone or can be a combination of hardware and software (including firmware).

As illustrated in FIG. 1 the controller 103 may be implemented using instructions that enable hardware functionality, for example, by using executable instructions of a computer program 109 in a general-purpose or special-purpose processor 105 that may be stored on a computer readable storage medium (disk, memory etc.) to be executed by such a processor 105.

The processor 105 is configured to read from and write to the memory 107. The processor 105 may also comprise an output interface via which data and/or commands are output by the processor 105 and an input interface via which data and/or commands are input to the processor 105.

The memory 107 is configured to store a computer program 109 comprising computer program instructions (computer program code 111) that controls the operation of the apparatus 101 when loaded into the processor 105. The computer program instructions, of the computer program 109, provide the logic and routines that enables the apparatus 101 to perform the methods illustrated in FIGS. 3, 4 and 5. The processor 105 by reading the memory 107 is able to load and execute the computer program 109.

Figure 4:
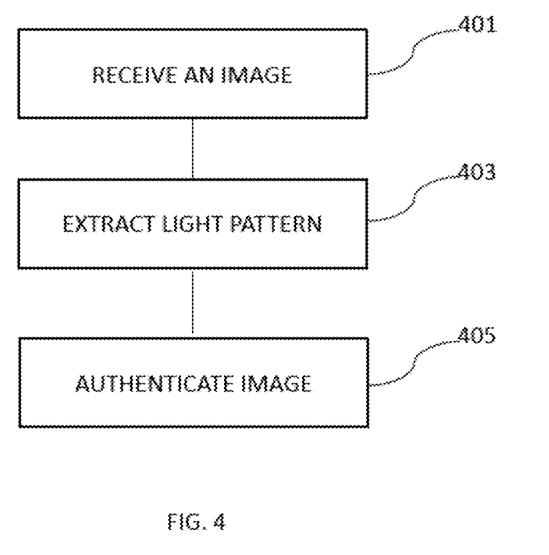
FIG. 4 shows an example method.

In examples where the apparatus 101 is provided within a server device the apparatus 101 therefore comprises: at least one processor 105; and at least one memory 107 including computer program code 111, the at least one memory 107 and the computer program code 111 configured to, with the at least one processor 105, cause the apparatus 101 at least to perform: receiving 401 one or more images captured by an imaging device 201; extracting 403 one or more light patterns from the one or more images where the one or more light patterns correspond to light reflected from at least part of an object 217 that was positioned out of field of view 213 of the imaging device 201 when the one or more images were captured so that the at least part the object 217 does not appear in the one or more images but light reflected from the at least part of the object 217 that was positioned out of field of view 213 creates the one or more light patterns in the one or more images; and determining 405 if the extracted one or more light patterns correspond to a predetermined object 217 to enable authentication of the one or more images.

Figure 3:
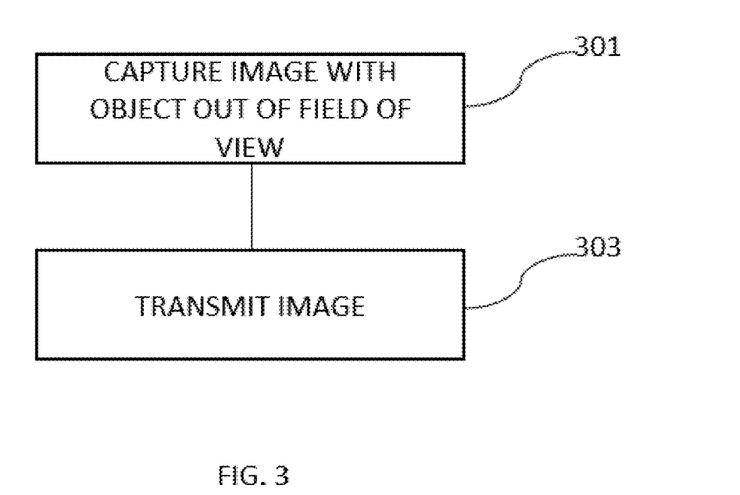
FIG. 3 shows an example method.

In some examples the apparatus 101 could be provided within an imaging device 201. In such examples the apparatus 101 comprises at least one processor 105; and at least one memory 107 including computer program code 111, the at least one memory 107 and the computer program code 111 configured to, with the at least one processor 105, cause the apparatus 101 at least to perform: capturing 301 one or more images while at least part of an object 217 is positioned out of field of view 213 of the imaging device 201 so that the at least part the object 217 does not appear in the one or more images but light reflected from the at least part of the object 217 that is positioned out of field of view 213 creates one or more detectable light patterns in the one or more images; and enabling 303 the one or more images to be transmitted to a third party apparatus to enable the one or more detectable light patterns to be used to authenticate the one or more images.

As illustrated in FIG. 1 the computer program 109 may arrive at the apparatus 101 via any suitable delivery mechanism 113. The delivery mechanism 113 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 109. The delivery mechanism may be a signal configured to reliably transfer the computer program 109. The apparatus 101 may propagate or transmit the computer program 109 as a computer data signal. In some examples the computer program 109 may be transmitted to the apparatus 101 using a wireless protocol such as Bluetooth, Bluetooth Low Energy, Bluetooth Smart, 6LoWPan (IP$_v$6 over low power personal area networks) ZigBee, ANT+, near field communication (NFC), Radio frequency identification, wireless local area network (wireless LAN) or any other suitable protocol.

The computer program 109 comprises computer program instructions for causing an apparatus 101 to perform at least the following: receiving 401 one or more images captured by an imaging device 201; extracting 403 one or more light patterns from the one or more images where the one or more light patterns corresponds to light reflected from at least part of an object 217 that was positioned out of field of view 213 of the imaging device 201 when the one or more images were captured so that the at least part the object 217 does not appear in the one or more images but light reflected from the at least part of the object 217 that was positioned out of field of view 213 creates the one or more light patterns in the one or more images; and determining 405 if the extracted one or more light patterns correspond to a predetermined object 217 to enable authentication of the one or more images.

In examples where the apparatus 101 is provided within an imaging device the computer program 109 comprises computer program instructions for causing an apparatus 101 to perform at least the following: capturing 301 one or more images while at least part of an object 217 is positioned out of field of view 213 of the imaging device 201 so that the at least part the object 217 does not appear in the one or more images but light reflected from the at least part of the object 217 that is positioned out of field of view 213 creates one or more detectable light patterns in the one or more images; and enabling 303 the one or more images to be transmitted to a third party apparatus to enable the one or more detectable light patterns to be used to authenticate the one or more images.

The computer program instructions may be comprised in a computer program 109, a non-transitory computer readable medium, a computer program product, a machine readable medium. In some but not necessarily all examples, the computer program instructions may be distributed over more than one computer program 109.

Although the memory 107 is illustrated as a single component/circuitry it may be implemented as one or more separate components/circuitry some or all of which may be integrated/removable and/or may provide permanent/semi-permanent/dynamic/cached storage.

Although the processor 105 is illustrated as a single component/circuitry it may be implemented as one or more separate components/circuitry some or all of which may be integrated/removable. The processor 105 may be a single core or multi-core processor.

References to "computer-readable storage medium", "computer program product", "tangibly embodied computer program" etc. or a "controller", "computer", "processor" etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" may refer to one or more or all of the following:
 (a) hardware-only circuitry implementations (such as implementations in only analog and/or digital circuitry) and
 (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions and
 (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in FIGS. 3 and 4 can represent steps in a method and/or sections of code in the computer program 109. The illustration of a particular order to the blocks does not necessarily imply that there is a required or preferred order for the blocks and the order and arrangement of the block may be varied. Furthermore, it can be possible for some blocks to be omitted.

Figure 2:
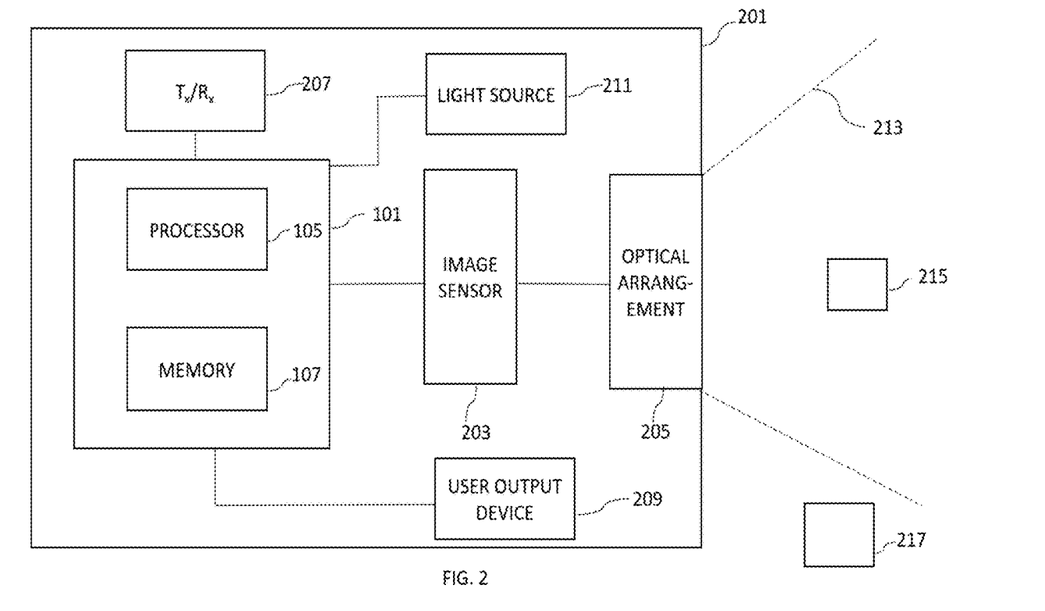
FIG. 2 shows an example imaging device.

FIG. 2 schematically shows an example imaging device 201 that comprises an apparatus 101 as shown in FIG. 1. The imaging device 201 could be a camera or a mobile phone or any other suitable device for capturing images.

The images that are captured could be single images such as photographs. In some examples the images could comprise a plurality of images such as video images or a burst of individual images.

In the example shown in FIG. 2 the imaging device 201 also comprises an image sensor 203, an optical arrangement 205, at least one transceiver 207, a user output device 209 and one or more light sources 211. It is to be appreciated that only components referred to in the following description have been shown in FIG. 2 and that other components could be provided in other examples of the disclosure.

In the example shown in FIG. 2 the imaging device 201 comprises one image sensor 203 and optical arrangement 205. It is to be appreciated that more than one image sensor 203 and/or optical arrangement 205 could be provided in other examples of the disclosure.

The image sensor 203 can comprise any means which can be configured to detect images. The image sensor 203 is coupled to the apparatus 101 to enable detected images to be stored in an image storage module. In some examples the image storage module could be part of the memory 107 of the apparatus 101. The image sensor 203 can comprise any suitable type of image sensor. For instance, the image sensor 203 can comprise a digital image sensor such as a charge-coupled-device (CCD) or a complementary metal-oxide-semiconductor (CMOS). The image sensor 203 can comprise a plurality of pixels arranged in a pixel array.

The image sensor 303 can be controlled by the apparatus 101 to enable images to be captured. Once an image has been captured it can be stored in the image storage module and/or transmitted to a third party.

The optical arrangement 205 can comprise any means which can be configured to direct images to the image sensor 203. The optical arrangement 205 can be positioned in front of the image sensor 203 so as to enable the images to be directed onto the image sensor 203. The optical arrangement 205 can comprise means for focusing or otherwise adjusting the images onto the image sensor 203. The optical arrangement 205 can comprise one or more optical devices such as one or more lenses.

The imaging device 201 has a field of view 213 indicated by the dashed lines in FIG. 2. The angular range of the field of view 213 can be determined by the optical arrangement 205, the position of the optical arrangement 205 relative to the image sensor 203 and any other relevant factors. The field of view 213 defines a region such that objects 215 that are positioned within the field of view 213 when an image is captured will appear in the one or more images.

Any objects 217, or parts of objects 217, that are not positioned within the field of view 213 when an image is captured will not appear in the image. However light can be reflected from objects 217, or parts of object 217, that are not positioned within the field of view 217. This light can then be reflected into the field of view 213 to create one or more light patterns that can be recorded within the captured image. In examples of the disclosure these light patterns can be used to authenticate the captured images.

The example imaging device 201 in FIG. 2 also comprises at least one transceiver 207. The at least one transceiver 207 can comprise any means that enables the imaging device 201 to communicate within a network. In some examples the transceiver 207 can comprise one or more wireless transmitter and/or receivers that enable the imaging device 201 to communicate in a wireless network such as cellular network, or low power radio frequency network or any other suitable type of network. In some examples the transceiver 207 could enable the imaging device 201 to communicate within a wired network.

The at least one transceiver 207 can enable images that have been detected by the image sensor 203 to be transmitted third party devices. The third party devices could be server devices that enable an online market place service to be provided or any other suitable type of devices.

The user output device 209 can comprise any means that can be configured to provide an output to a user of the imaging device 201. In some examples the user output device 209 can comprise a screen or other output means that can enable visual outputs to be provided to the user. In some examples the user output device 209 could comprises an audio output device that can enable an audible output to be provided to the user.

The user output device 209 can be configured to provide outputs to the user that assist the user in controlling the imaging device 201. For example, the user output device 209 can provide an indication as to whether objects 215, 217 are positioned within the field of view or not. In some examples of the disclosure the user output device 209 can provide an indication to a user that an object 217 is positioned in the correct position so that at least part of an object 217 is not within the field of view 213 but one or more detectable light patterns reflected from the object can be provided within the field of view.

The example imaging device 201 of FIG. 2 also comprises one or more light sources 211. The light sources 211 can comprise one or more light emitting diodes, a display of the imaging device or any other suitable type of light sources. In some examples the display that is used to provide the light sources 211 could be a rear display or a wraparound display. This can enable light to be emitted from the rear of the imaging device 201 while a front facing display can be used by the user to view the scene or other wise control the imaging device 201.

The light sources 211 can be configured to direct light into the field of view 213 of the imaging device 201 to enable objects 215 within the field of view 213 to be illuminated.

In some examples the light sources 211 can be configured to provide a coded lighting output. In some examples the coded lighting output can comprise a spatial variation in lighting. For example different sections of a display could be illuminated differently. In a static coded lighting output the different sections of the display could be illuminated to provide different frequencies or different intensities. In other examples the coded lighting output could be dynamic so that it changes over time. For example the coded lighting output could comprise a lighting sequence comprising the use of different frequencies, intensities and/or lighting positions at different times.

The coded lighting output provided by the one or more light sources 211 can enable one or more unique light patterns to be reflected from objects 217, or parts of objects, that are out of the field of view 213 of the imaging device 201 so that the reflected one or more light patterns are captured by the image sensor 203 when one or more images are captured.

FIG. 3 shows a method that can be performed by an apparatus in some examples of the disclosure. The example method of FIG. 3 could be performed by an apparatus 101 that is provided within an imaging device 201 as shown in FIG. 2 or any other suitable type of device.

The method comprises, at block 301, capturing one or more images. The one or more images can be captured by the image sensor 203. In some examples a single image such as a photograph could be captured. In other examples a plurality of images, such as a video image or a burst of individual images, could be captured. Once the one or more images have been captured they can be stored in the image storage module or any other suitable means.

The apparatus 101 can control the image sensor 203 to capture an image of a scene positioned within the field of view 213 of the imaging device 201. In examples of the disclosure at least part of an object 217 is positioned out of the field of view 213 of the imaging device 201 when the image is captured. The object 217 is positioned out of the field of view 213 so that at least part of the object 217 does not appear in the image but light reflected from the at least part of the object 217 that is positioned out of field of view 213 can be reflected into the field of view 213 to create one or more detectable light patterns within the image.

The object 217 can comprise any object 217 that can be positioned, at least partially, out of the field of view 213 of the imaging device 201 and reflect light into the field of view 213 so as to provide one or more identifiable light patterns within images captured by the imaging device 201. In some examples the object 217 can comprise the hands, or other parts of the body, of the user who is using the imaging device 201. In some examples the object 217 could comprise an object 217 that has been preselected to provide one or more light patterns that enable the user to be authenticated.

In some examples the object 217 might need to be positioned correctly while the image is being captured in order to enable one or more correct light patterns to be created within the image. For example, the object 217 has to be positioned so that at least part of the object 217 is out of the field of view 213 and so that light can be reflected from the object 217 into the field of view 213. In some examples the object 217 can be positioned to the side of the imaging device 201 or in any other suitable location.

In some examples the imaging device 201 can be configured to provide instructions to the user of the imaging device 201 to help the user position the object 217 correctly while the image is being captured. In such examples the imaging device 201 could detect the position of the object 217 and provide feedback to the user indicating whether or not the object 217 is in the correct position. The user output device 209 can be controlled by the apparatus 201 to provide the instructions and feedback.

In some examples the instructions that are provided by the user output device 209 can also comprise information relating to an orientation of the object 217. For some objects 217 the light reflected into the field of view 213 could be dependent upon the orientation of the object 217. For instance, where the object 217 comprises a user's hand the light reflected from the back of the hand will be different to the light reflected from the palm of the hand. Therefore, in order to obtain one or more identifiable light patterns the user can be instructed to position their hands in a predetermined orientation. The imaging device 201 can be configured to detect the orientation of the object 217 and use the user output device 209 to provide an indication to the user whether or not the orientation is correct In some examples the user could be required to perform a gesture with the object 217 while the image is being captured. For instance, if the object 217 is the user's hands the user could be required to move their hands in a predefined gesture. The gesture could be the user providing a thumbs up sign or waving their hands in a predefined motion or any other suitable gesture. The user output device 209 could provide an indication of the gesture that is to be performed to assist the user in performing the gesture correctly.

In some examples when the object 217 is positioned in the correct position the user output device 209 can be configured to provide an output to the user to indicate that the object 217 has been used correctly. For example, an output can indicate that the object 217 was in the correct position and/or orientation while the image was being captured.

If it is detected that the object 217 was not in the correct position while the image was being captured then the user output device 209 could be configured to notify a user of this and could enable the user to capture another image.

In some examples the apparatus 201 can be configured to control the light source 211 to enable an identifying coded lighting output to be used for capturing the image. The identifying coded lighting output can be predetermined in conjunction with an authorising entity or other third party device so that the authorising entity or third party device knows what coded lighting output is used. The authorising entity can then use this knowledge of the coded lighting output when extracting the one or more light patterns from the image. The authorising entity could be a device associated with an online market place or any other suitable type of device.

The coded lighting output can be unique in that it is only used once. That is, a new coded lighting output can be determined between the imaging device 201 and an authorising entity whenever a new image needs to be authenticated.

The identifying light sequence can be used to ensure that one or more identifiable light patterns are provided by the reflection from the object 217, or part of the object 217, that is not within the field of view 213 of the imaging device 201. The light sequence can comprise a sequence that varies in brightness or colour or spatial variations in order to provide a unique sequence.

At block 303 the method comprises enabling the image that has been captured to be transmitted to a third party device to enable the one or more detectable light patterns to be used to authenticate the image. The third party device could be a server device that enables an online market place to be provided, or any other suitable type of device. The image could be transmitted via the one or more transceivers 207 of the imaging device 201.

FIG. 4 shows another method that can be performed in examples of the disclosure. The method can be performed by third party devices that receive the images that have been captured by the imaging devices 201. The third party device could be an authentication server. The third party device could be configured to provide an online market place or any other service which requires images to be authenticated.

The method comprises, at block 401, receiving an image captured by an imaging device 201. The image could have been captured using the methods shown in FIG. 3 so that the image comprises one or more light patterns corresponding to light reflected from at least part of an object 217 that was positioned out of field of view 213 of the imaging device 201 when the image was captured. The part of the object 217 that was positioned out of the field of view 213 does not appear in the image but light reflected from the at least part of the object 217 that was positioned out of field of view 213 forms one or more light patterns in the image.

At block 403 the method comprises extracting one or more light patterns from the image. Any suitable process can be used to extract the one or more light patterns from the image. For example, image recognition can be used to identify variations in light intensity within specific regions of the image. In some examples, knowledge of the coded lighting output that was used when the image was captured can be used to extract the one or more light patterns.

At block 405 the method comprises determining if the extracted one or more light patterns corresponds to a predetermined object 217 to enable authentication of the image. If the extracted one or more light patterns correlate with one or more predetermined light patterns then it can be determined that the correct object 217 has been positioned in the correct location and this can satisfy the third party device that the image has been captured by an authorised user. If the extracted one or more light patterns do not correlate with at least one predetermined light pattern then the third party can indicate that the image cannot be authenticated.

The apparatus 101 within the third party device can use any suitable process to determine if the extracted one or more light patterns correspond to a predetermined object 217. In some examples the third party device can store a database of light patterns associated with authorised users. The database can be populated by requiring the users to capture calibration images in which the objects 217 are positioned to create one or more light patterns. The one or more light patterns in these images can then be compared with one or more light patterns captured at a later point in time.

In some examples the apparatus 101 within the third party device can use machine learning to determine if the extracted one or more light patterns correspond to a predetermined object 217. In some examples information such as the light that has been used within the field view can be added to the training data of the machine learning algorithms and used to help to determine if the extracted one or more light patterns corresponds to a predetermined object 217.

The predetermined object 217 can be an object that is specific to the user of the imaging device 201 that has captured the image. The predetermined object 217 could be part of the user's hand or body or any other suitable object. The object 217 could also be positioned at a predetermined location and/or orientation relative to the imaging device 201 when the image is being captured. In some examples the user can move the object 217 or make a gesture with the object 217 when the image is being captured.

In some examples the object 217 can be positioned partially out of the field of view 213 when the image is being captured so that a part of the object 217 is within the field of view 213. This causes the part of the object 217 that is within the field of view 213 to be visible within the captured image. In such cases the part of the object 213 that is in the image could be used to help extract one or more light patterns from the image. For instance, the position of the part of the object 217 within the image can be used to determine the location of the one or more reflected light patterns within the image.

In some examples the part of the object 217 that is in the image could be removed from the image once the one or more light patterns have been extracted. Any suitable image editing processes could be used to remove the object from the image. This can enable a clean image, with no unwanted objects in, to be provided for the online market place or other service.

In some examples, an identifying light sequence can be used when the image is being captured. The identifying light sequence can be determined by the third party device or by the imaging device 201. The identifying light sequence can be used, in combination with the object 217 out of the field view 213, to create one or more specific light patterns within the image. The identifying light sequence can be reflected or scattered by the object 217 out of the field of view 213 to create one or more unique light patterns.

Information associating the identifying light sequence with a user can be stored in a database that can be accessed by the third party device. The database can also store information of one or more light patterns created by the reflection from objects 217 out of the field of view 213 that can be detected in the images when the identifying light sequence is used to capture images.

The identifying coded lighting output comprises one or more of; spatial variation in light, variation in colours of light, variations in intensity of the light or any other suitable variations in the light.

In some examples the coded lighting output could comprise a temporal variation in the lighting that is used. This change in the lighting over time could be captured in video images, a burst of individual images, a single image with a long exposure time or any other suitable type of image or images.

Figure 5:
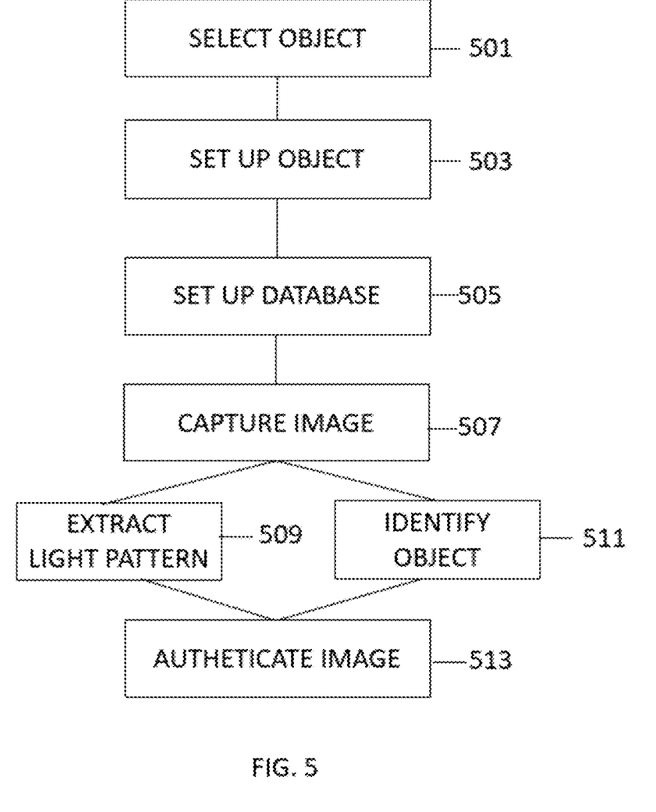
FIG. 5 shows an example method.

FIG. 5 shows another example method of embodiments of the disclosure. The method can be implemented using imaging devices 201 and third party devices that comprise apparatus 101 as described above.

The method comprises, at block 501, selecting an object 217 that can be used to provide one or more identifiable light patterns within the image. The object 217 can be any object 217 that provides sufficient reflection or diffuse scattering of light to create one or more detectable light patterns within the image when the object 217 is positioned out of field of view 213 of the imaging device 201.

In some examples the object 217 could be selected to be held in a stationary position relative to the imaging device 201 when the image is captured. In other examples the object 217 could be selected to be moved in a particular sequence when the image is being captured. The movement of the object 217 could be captured in video images, a burst of individual images, a single image with a long exposure time or any other suitable type of image or images.

In some examples the object 217 could be selected to be held in a specific position relative to the imaging device 201. The specific position could comprise an angular location relative to the imaging device 201, a distance from the imaging device 201, an elevation relative to the imagine device 201, an orientation relative to the imaging device 201 or any other suitable position.

The object 217 can be selected by the user of the imaging device 201. For instance, the user of the imaging device 201 can select an object 217 that is easy for them to remember or is comfortable for them to use while the image is being captured. In other examples the object 217 can be selected by a third party device. For instance, a third party device can determine objects 217 that provide one or more identifiable light patterns within an image and select one of these objects 217 for the user. The user can then be notified of the object 217 that has been selected for them.

At block 503 the object 217 is set up. The setting up of the object 217 comprises the user of the imaging device 201 capturing an image with the object 217 positioned out of field of view 213 in accordance with the selection procedure made at block 501. The user output device 209 can be configured to provide an indication to the user whether or not the object 217 has been used correctly.

This enables an image comprising a one or more light patterns relating to the object 217 to be captured.

At block 505 a database is set up. Information relating to one or more light patterns obtained at block 503 can be stored in the database and associated with the user. The information relating to the one or more light patterns can also be associated with the object 217 that was selected at block 501. This database can be accessed at a later point in time by an authenticating third party device to enable images to be authenticated using the one or more light patterns.

At block 507 a new image is captured. The capturing of the new image can occur some time after the methods of block 501 to 505 have been carried out. For example, selecting the object 217 and setting up the database could be performed when a user registers with a service such as an online market place. The method of blocks 507 to 513 could be performed to authenticate the user when the user wishes to provide new images to the online service.

The image is captured by the imaging device 201 with the object 217 positioned, at least partially, out of the field of view 213. The image can then be transmitted to the third party device for authentication.

At block 509 the third party device extracts one or more light patterns from the image. The one or more light patterns can be extracted using image recognition algorithms or any other suitable means. In some examples, at block 511, the third party device can be configured to use the extracted one or more light patterns to identify the object 217. For instance the third party device can access the database to correlate one or more extracted light patterns with an object 217. If the object 217 matches the predetermined object 217 that was selected at block 501 then, at block 513 the third party device can authenticate the image. This could enable the third party device to verify that the image has been captured by an authorised user.

Figure 6:
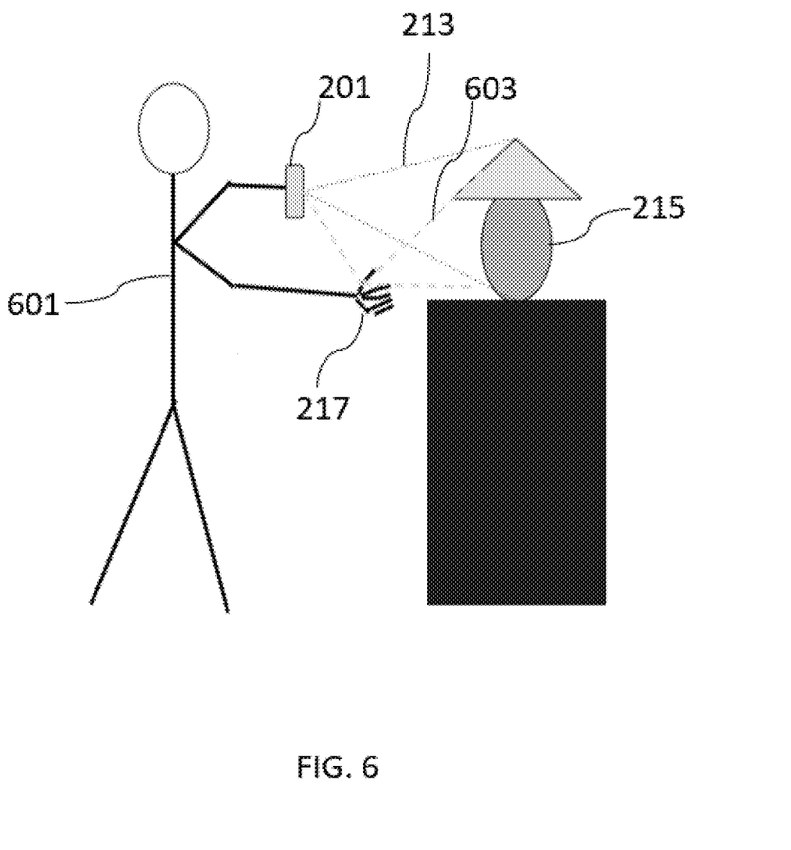
FIG. 6 shows an example imaging device in use.

FIG. 6 shows an example imaging device 201 being used by a user 601 to capture an image. In this example the user wishes to sell the object 215 in an online market place. The object 215 is a lamp, other objects could be used in other examples of the disclosure. The user positions the lamp 215 within the field of view 213 of the imaging device 201 to enable an image of the lamp to be captured.

In order to authenticate the image, the user 601 positions a predetermined object 217 out of the field of view 213 of the imaging device 201. In this example the object 217 is the user's hand. The hand could perform a predetermined gesture. Other objects 217 could be used in other examples of the disclosure.

The object 217 is positioned so that it does not appear within the image. However light 603 from the imaging device 201 can be reflected or otherwise scattered from the object 217 into the field of view 213 as indicated by the dashed lines in FIG. 6. The object 217 therefore acts as a diffuse mirror or scattering object that directs one or more light patterns into the image. The one or more light patterns can therefore provide a code that is unique to the user and so can be used to authenticate images captured by the user 601.

Examples of the disclosure therefore provide apparatus 101, methods and computer programs 109 for authenticating images by using one or more light patterns reflected or otherwise scattered from an object 217, or part of an object 217, that is positioned out of the field of view 213 of the imaging device 201. The one or more light patterns act as a code within the image that would not be noticed by other users of the system. For example, a purchaser viewing the image might not notice the one or more light patterns within the image. However, the one or more light patterns can be extracted and identified to enable authentication of the user 601 as described above. Using the one or more light patterns within the image as a code removes the need for any additional data such as metadata to be sent with the image for authentication. Such metadata could be removed from the image whereas the one or more light patterns are part of the image itself and so cannot be removed.

As mentioned above the apparatus 101, methods and computer programs 109 can use machine learning to determine if one or more extracted light patterns correspond to a predetermined object. The machine learning can include statistical learning. Machine learning is a field of computer science that gives computers the ability to learn without being explicitly programmed. The computer learns from experience E with respect to some class of tasks T and performance measure P if its performance at tasks in T, as measured by P, improves with experience E. The computer can often learn from prior training data to make predictions on future data. Machine learning includes wholly or partially supervised learning and wholly or partially unsupervised learning. It may enable discrete outputs (for example classification, clustering) and continuous outputs (for example regression). Machine learning may for example be implemented using different approaches such as cost function minimization, artificial neural networks, support vector machines and Bayesian networks for example. Cost function minimization may, for example, be used in linear and polynomial regression and K-means clustering. Artificial neural networks, for example with one or more hidden layers, model complex relationship between input vectors and output vectors. Support vector machines may be used for supervised learning. A Bayesian network is a directed acyclic graph that represents the conditional independence of a number of random variables.

The above described examples find application as enabling components of:

automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The recording of data may comprise only temporary recording, or it may comprise permanent recording or it may comprise both temporary recording and permanent recording, Temporary recording implies the recording of data temporarily. This may, for example, occur during sensing or image capture, occur at a dynamic memory, occur at a buffer such as a circular buffer, a register, a cache or similar. Permanent recording implies that the data is in the form of an addressable data structure that is retrievable from an addressable memory space and can therefore be stored and retrieved until deleted or over-written, although long-term storage may or may not occur. The use of the term 'capture' in relation to an image relates to temporary recording of the data of the image. The use of the term 'store' in relation to an image relates to permanent recording of the data of the image.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

The invention claimed is:

1. An apparatus comprising:
   at least one processor; and
   at least one non-transitory memory including computer program code, the at least one non-transitory memory and the computer program code configured to, with the at least one processor, cause the apparatus to:
   receive one or more images captured by an imaging device;
   extract one or more light patterns from the one or more images where the one or more light patterns correspond to light reflected from at least part of an object that was positioned out of a field of view of the imaging device when the one or more images were captured, wherein the at least part of the object does not appear in the one or more images; and
   determine if the extracted one or more light patterns correspond to a predetermined object to enable authentication of the one or more images.

2. An apparatus as claimed in claim 1 wherein the predetermined object comprises a specific object that creates one or more detectable light patterns within one or more specific images when the specific object is positioned at least partially out of the field of view of the imaging device while the one or more specific images are captured.

3. An apparatus as claimed in claim 1 wherein the predetermined object comprises an object that is specific to a user of the imaging device.

4. An apparatus as claimed in claim 1 wherein the predetermined object comprises a user's hand performing a predetermined gesture at least partially out of the field of view of the imaging device.

5. An apparatus as claimed in claim 1 wherein the object is positioned at least partially out of the field of view of the imaging device so that at least part of the object does not appear in the one or more images but light reflected from the object is captured in the one or more images.

6. An apparatus as claimed in claim 1 wherein the predetermined object is positioned at a predetermined location relative to the imaging device when the one or more images are captured.

7. An apparatus as claimed in claim 1 wherein the at least one non-transitory memory and the computer program code are configured to, with the at least one processor, cause the apparatus to: access a database comprising information associating a user of the imaging device with the predetermined object.

8. An apparatus as claimed in claim 1 wherein the at least one non-transitory memory and the computer program code are configured to, with the at least one processor, cause the apparatus to: determine an identifying coded lighting output and enable the identifying coded lighting output to be provided to the imaging device so that the identifying coded lighting output can be used by the imaging device to ensure that one or more identifiable light patterns are provided by reflection from the at least part of the object that was positioned out of the field of view when the one or more images are captured.

9. An apparatus as claimed in claim 8 wherein the identifying coded lighting output comprises one or more of: spatial variation in light, variation in colours of light, or variations in intensity of the light.

10. A method comprising:
receiving one or more images captured by an imaging device;
extracting one or more light patterns from the one or more images where the one or more light patterns correspond to light reflected from at least part of an object that was positioned out of a field of view of the imaging device when the one or more images were captured so that the at least part of the object does not appear in the one or more images but light reflected from the at least part of the object that was positioned out of the field of view creates the one or more light patterns in the one or more images; and determining if the extracted one or more light patterns correspond to a predetermined object to enable authentication of the one or more images.

11. A method as claimed in claim 10 wherein the predetermined object comprises a specific object that creates one or more detectable light patterns within one or more specific images when the specific object is positioned at least partially out of the field of view of the imaging device while the one or more specific images are captured.

12. A method as claimed in claim 10 wherein the predetermined object comprises an object that is specific to a user of the imaging device.

13. A method as claimed in claim 10 wherein the predetermined object is positioned at a predetermined location relative to the imaging device when the one or more images are captured.

* * * * *